US009643799B2

(12) United States Patent
McIlrath et al.

(10) Patent No.: US 9,643,799 B2
(45) Date of Patent: May 9, 2017

(54) PNEUMATIC CONVEYOR

(71) Applicant: Compass Minerals Manitoba Inc., Winnipeg (CA)

(72) Inventors: Michael McIlrath, Winnipeg (CA); Brenda Dubeck, Winnipeg (CA)

(73) Assignee: Compass Minerals Manitoba Inc., Winnipeg, Manitoba (CA)

( * ) Notice: Subject to any disclaimer, the term of this patent is extended or adjusted under 35 U.S.C. 154(b) by 0 days.

(21) Appl. No.: 14/700,598

(22) Filed: Apr. 30, 2015

(65) Prior Publication Data

US 2015/0314970 A1 Nov. 5, 2015

Related U.S. Application Data

(60) Provisional application No. 61/986,634, filed on Apr. 30, 2014.

(51) Int. Cl.
| | |
|---|---|
| *B65G 53/40* | (2006.01) |
| *B65G 53/50* | (2006.01) |
| *B65G 53/16* | (2006.01) |
| *B65G 53/36* | (2006.01) |
| *B65D 88/54* | (2006.01) |
| *B65G 53/12* | (2006.01) |

(52) U.S. Cl.
CPC ........... *B65G 53/50* (2013.01); *B65D 88/548* (2013.01); *B65G 53/12* (2013.01); *B65G 53/16* (2013.01); *B65G 53/36* (2013.01)

(58) Field of Classification Search
CPC ........ B65G 53/50; B65G 53/16; B65G 53/36; B65D 88/70; B65D 88/703; B65D 88/706; B65D 88/548; B65D 88/72
USPC ................. 406/118, 122, 134, 136, 137, 146

IPC ................ B65D 88/70,88/703, 88/706, 88/548, 88/72
See application file for complete search history.

(56) References Cited

U.S. PATENT DOCUMENTS

| | | | | |
|---|---|---|---|---|
| 1,127,660 A | * | 2/1915 | McMichael | B65G 53/12 366/5 |
| 1,240,409 A | * | 9/1917 | Black | A01D 46/10 266/281 |
| 1,535,991 A | | 4/1925 | Crom | |
| 1,644,699 A | * | 10/1927 | Ward | B65G 53/30 406/146 |
| 1,817,240 A | * | 8/1931 | Cuthbertson | B65G 53/12 222/394 |

(Continued)

OTHER PUBLICATIONS

Lancaster Products Lancaster® KT Transporter Lancaster® Bulk Bag Unloader Brochure, Aug. 6, 2010, www.lancasterproducts.com, 2 pages.

(Continued)

*Primary Examiner* — William R Harp
(74) *Attorney, Agent, or Firm* — Hovey Williams LLP

(57) ABSTRACT

A pneumatic conveyor is operable to convey fine material and includes a pressure vessel and a pneumatic injection port. The pressure vessel presents a chamber operable to receive fine material and to be selectively pressurized with air to pressurize and convey the fine material. The pressure vessel includes an inclined wall that extends upwardly relative to an outlet, with fine material in the chamber being collected by the inclined wall and urged toward the outlet. The injection port fluidly communicates with the chamber, with the injection port located adjacent the outlet to inject compressed air into the flow of pressurized fine material.

9 Claims, 6 Drawing Sheets

(56) References Cited

U.S. PATENT DOCUMENTS

| | | | | | |
|---|---|---|---|---|---|
| 3,197,259 | A | * | 7/1965 | Braun-Angott | B65D 88/70 406/146 |
| 3,366,282 | A | * | 1/1968 | Lucas | B65D 88/70 222/195 |
| 3,942,689 | A | * | 3/1976 | Dakin, Jr. | B65D 88/70 222/195 |
| 4,592,679 | A | * | 6/1986 | Boiting | B65G 53/66 406/127 |
| 4,934,569 | A | * | 6/1990 | Womack, Jr. | B65D 88/70 222/195 |
| 5,248,227 | A | * | 9/1993 | Hidock | B60P 1/60 406/108 |
| 5,845,386 | A | * | 12/1998 | Watts | F16L 23/032 285/179 |
| 6,386,800 | B1 | * | 5/2002 | van Eyck | B65G 53/66 406/14 |

OTHER PUBLICATIONS

Airplaco Equipment Company Powder Monkey Brochure, Apr. 8, 2014, www.powder-monkey.net, 3 pages.

Cyclonaire Pneumatic Conveying Systems DPG-B Conveyors Brochure, 2010, www.cyclonaire.com, 1 page.

* cited by examiner

PNEUMATIC CONVEYOR

RELATED APPLICATION

This application claims the benefit of U.S. Provisional Application Ser. No. 61/986,634, filed Apr. 30, 2014, entitled MICROCHARGER, which is hereby incorporated in its entirety by reference herein.

BACKGROUND

1. Field

The present invention relates generally to pneumatic conveying systems. More specifically, embodiments of the present invention concern a pneumatic conveyor for conveying a batch of fine material.

2. Discussion of Prior Art

Conventional pressure vessels are commonly used to transport fine materials through a line in a dense-phase flow using compressed air. These known pressure vessels can be loaded with material, which collects at the bottom of the vessel adjacent to an outlet. The vessel is pressurized with compressed air in the space above the material so that the compressed air forces the material through the outlet.

However, these known systems have certain deficiencies. For instance, the outlet of the prior art pressure vessel becomes clogged when attempting to convey very fine materials, such as Type C powder materials. Conventional pressure vessels also do not permit the operator to load and convey a custom mixture of multiple fine materials.

SUMMARY

The following brief summary is provided to indicate the nature of the subject matter disclosed herein. While certain aspects of the present invention are described below, the summary is not intended to limit the scope of the present invention.

Embodiments of the present invention provide a pneumatic conveyor that does not suffer from the problems and limitations of the prior art systems set forth above.

A first aspect of the present invention concerns a pneumatic conveyor operable to convey fine material. The conveyor broadly includes a pressure vessel and a pneumatic injection port. The pressure vessel presents a chamber operable to receive fine material and to be selectively pressurized with air to pressurize and convey the fine material. The pressure vessel includes a lowermost end that presents an outlet to discharge a flow of pressurized fine material from the chamber. The pressure vessel includes an inclined wall that extends upwardly relative to the outlet, with fine material in the chamber being collected by the inclined wall and urged toward the outlet. The pneumatic injection port fluidly communicates with the chamber, with the injection port located adjacent the outlet to inject compressed air into the flow of pressurized fine material.

A second aspect of the present invention concerns a method of pneumatically conveying a batch of fine material in a dense-phase flow. The method broadly includes the steps of loading the batch of fine material into the chamber of a pressure vessel, with the batch of fine material collecting in a lowermost end of the chamber adjacent an outlet of the pressure vessel; charging the chamber with compressed air to a pressure above the ambient pressure outside the chamber; injecting compressed air within the batch of fine material adjacent the outlet; and after the loading and charging steps, discharging at least part of the batch of fine material from the chamber.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 4:
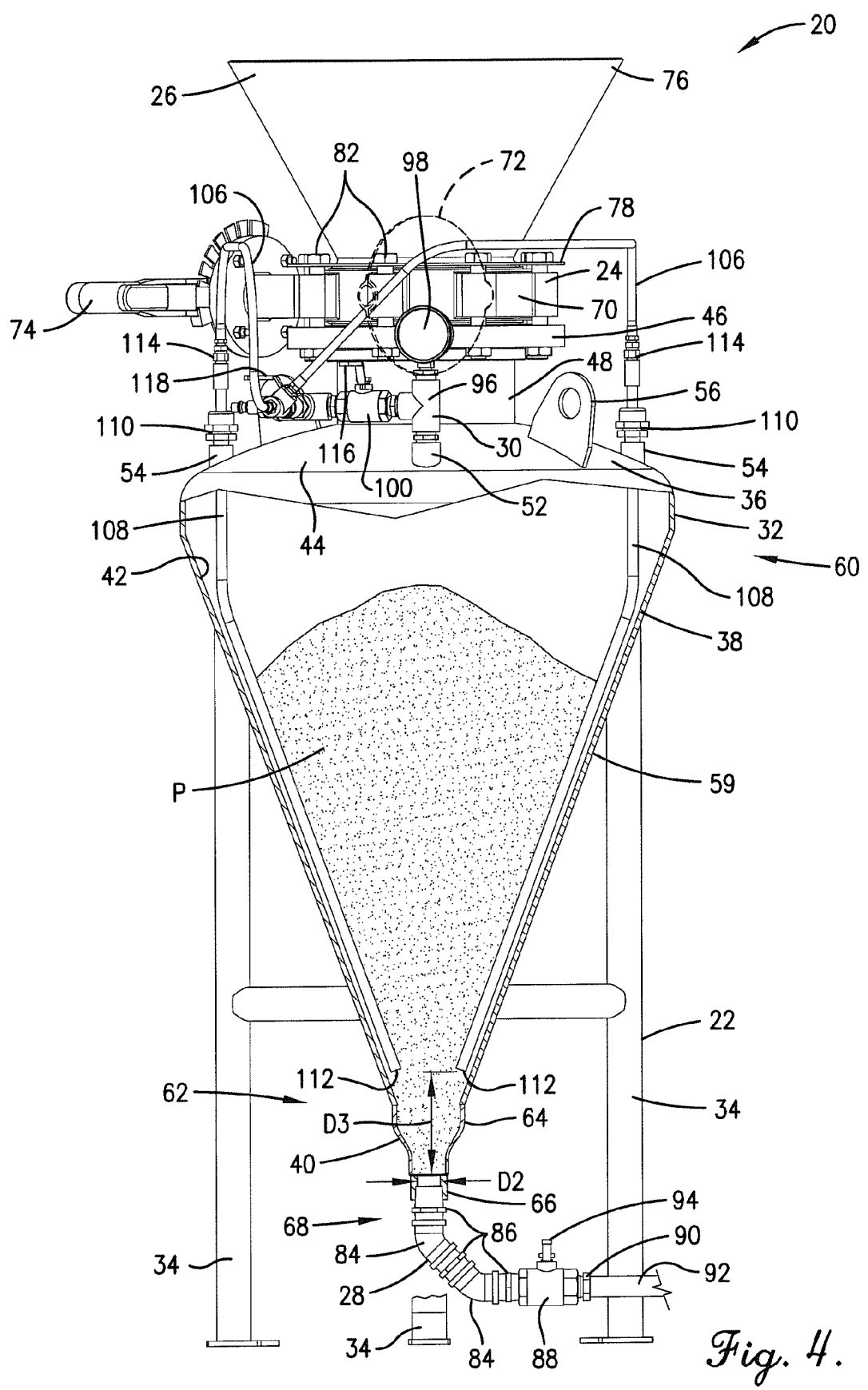
FIG. 4 is a side elevation of the pneumatic conveyor shown in FIGS. 1-3, depicting part of the pressure vessel cross sectioned to show a batch of fine material loaded in a chamber of the pressure vessel, with a discharge valve adjacent the bottom of the pressure vessel being closed, and with main inlet valve and injection inlet valve of the pneumatic supply assembly being closed.
Figure 5:
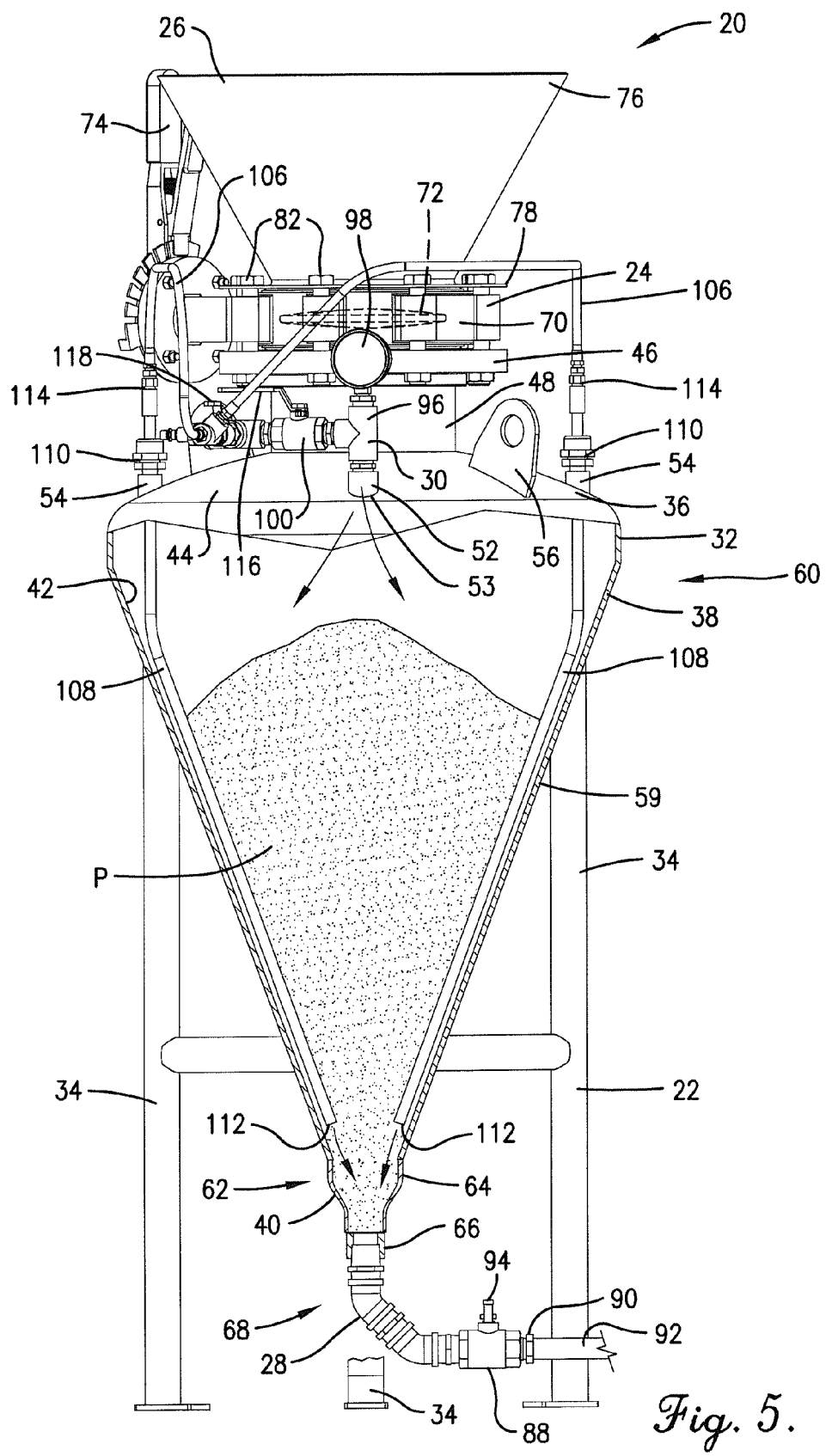
Figure 6:
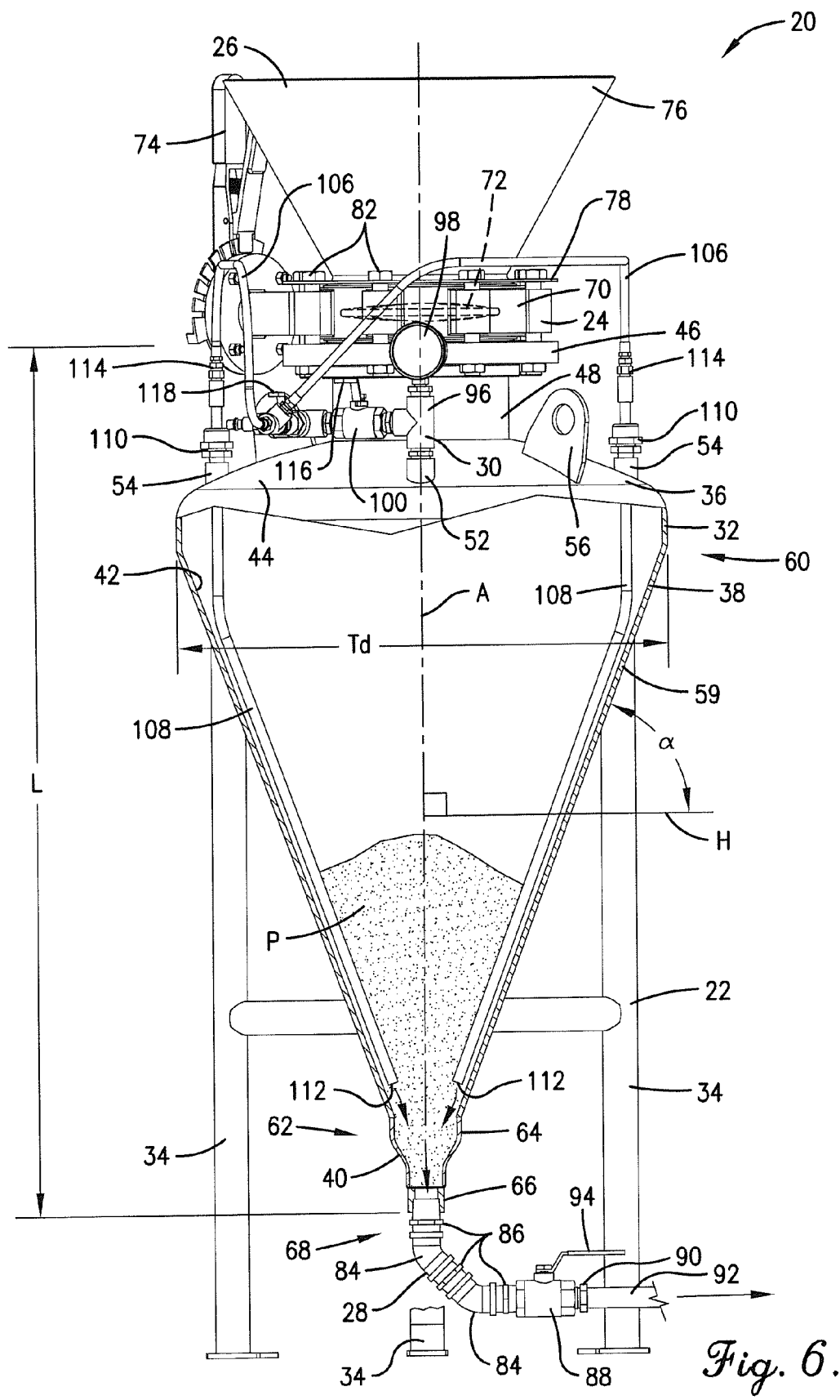

FIG. 5 is a side elevation of the pneumatic conveyor similar to FIG. 4, but showing the fill valve closed and the inlet valves opened to pressurize the chamber and inject compressed air into the batch of material; and FIG. 6 is a side elevation of the pneumatic conveyor similar to FIG. 5, but showing the discharge valve opened to discharge the batch of material from the chamber, with the main inlet valve closed, and with the injection inlet valve open to inject compressed air into the batch of material.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
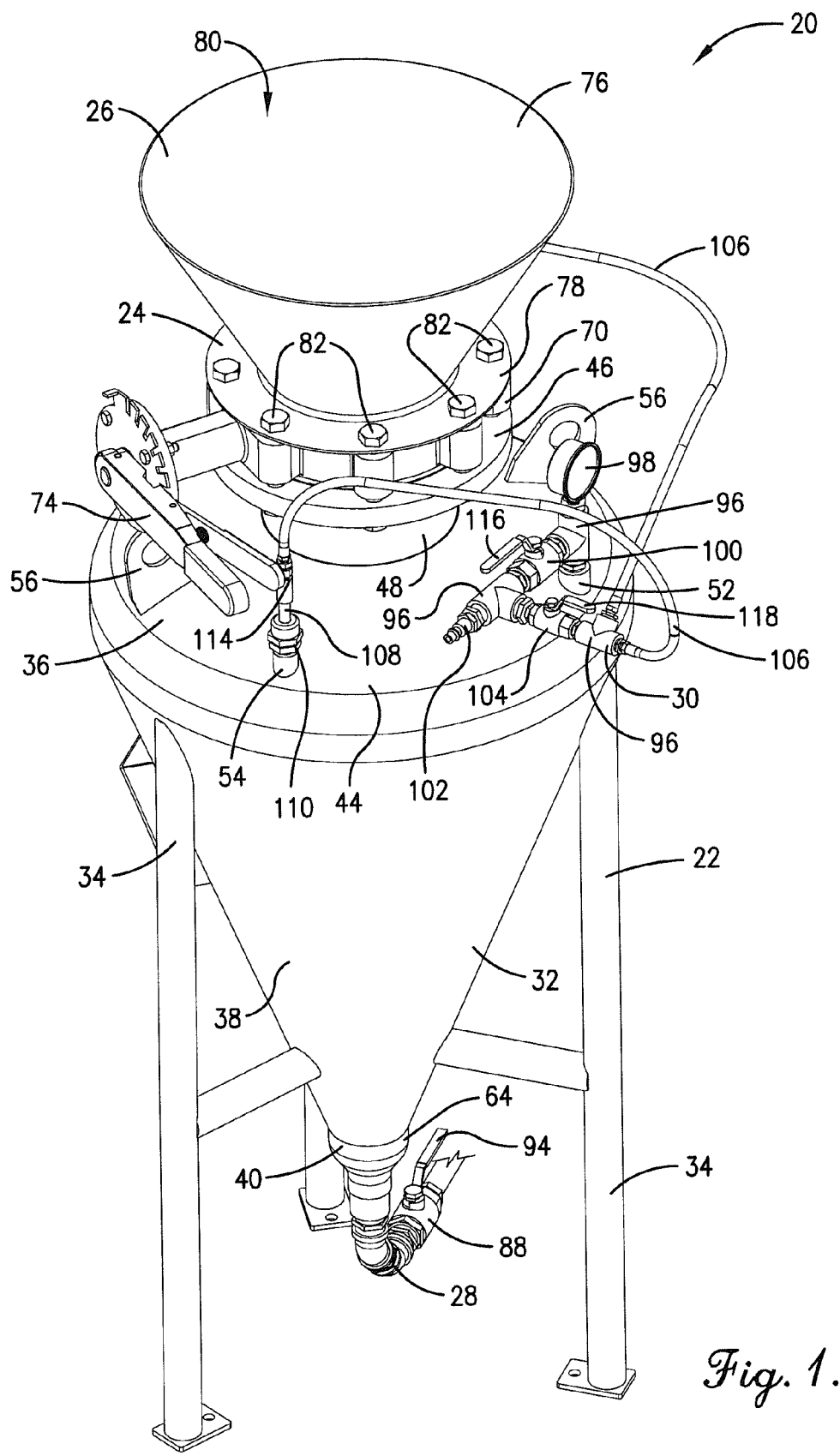
FIG. 1 is an upper front perspective of a pneumatic conveyor operable to convey fine materials and constructed in accordance with a preferred embodiment of the present invention, showing a pressure vessel, funnel, fill valve, discharge tube assembly, and pneumatic supply assembly of the pneumatic conveyor.
Figure 2:
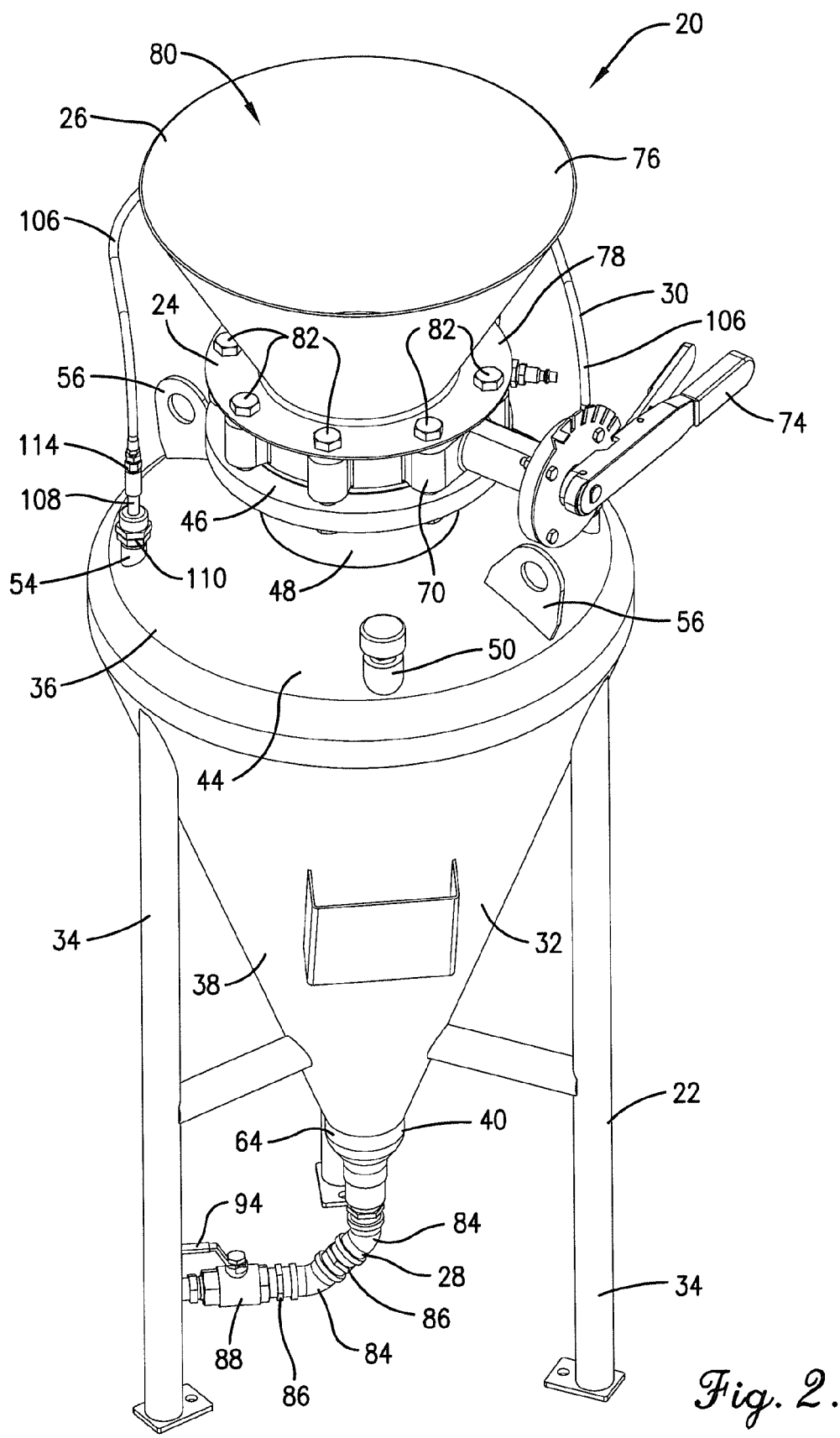
FIG. 2 is an upper left side perspective of the pneumatic conveyor shown in FIG. 1.

Turning initially to FIGS. 1 and 2, a fine material conveyor 20 is constructed in accordance with a preferred embodiment of the present invention. The conveyor 20 is operable to convey a batch of powder material P (see FIGS. 4-6). As will be described, the conveyor 20 is able to convey the material P as part of a dense-phase conveying process.

The illustrated conveyor 20 is preferably used to transport material P to the top of a tower in a fertilizer blend plant (not shown). However, it will be appreciated that the conveyor 20 can be used to transport fine materials for other applications. For instance, fine materials can be conveyed by the conveyor 20 to various types of containers, vessels, processing equipment, etc. The conveyor 20 preferably includes a pressure vessel 22, fill valve 24, funnel 26, discharge tube assembly 28, and pneumatic supply assembly 30.

The conveyor 20 is designed to transport so-called "Type C" powders. Type C powders include particles that range in size from about two (2) microns to about one hundred (100) microns. However, it will be understood that the conveyor 20 can be used to convey relatively larger particles. For instance, the conveyor 20 can transport larger powders (e.g., particles ranging from about one hundred (100) microns to about three thousand (3000) microns). The conveyor 20 can also transport even larger material particles, such as granules, pellets, etc.

The conveyor 20 is preferably configured to transport various materials used in connection with fertilizers. These materials include oxides (such as zinc oxide and iron oxide), sulfates (such as zinc sulfate, manganese chloride sulfate), urea, and inerts. However, the conveyor 20 can also be used to convey other particulate materials.

Turning to FIGS. 1-4, the pressure vessel 22 is used to receive and hold the material P under a pressure elevated above the ambient pressure. The pressure vessel 22 preferably includes an elongated tank 32 and supports 34 fixed to the tank 32. The tank 32 includes an upper inlet section 36, a tubular section 38, and a lower fitting 40 that are fixed to one another and cooperatively form a chamber 42 (see FIG. 4).

Preferably, the inlet section 36 is unitary and includes an annular body 44, an endmost flange 46, and a tube 48 that interconnects the body 44 and the flange 46. The inlet section 36 also preferably includes a pressure relief fitting 50, a main air fitting 52, opposite injection fittings 54, and opposite lifting lugs 56, with the fittings 50,52,54 and lugs 56 being welded to the annular body 44. The main air fitting 52 presents a main supply port 53 (see FIG. 5).

Figure 3:
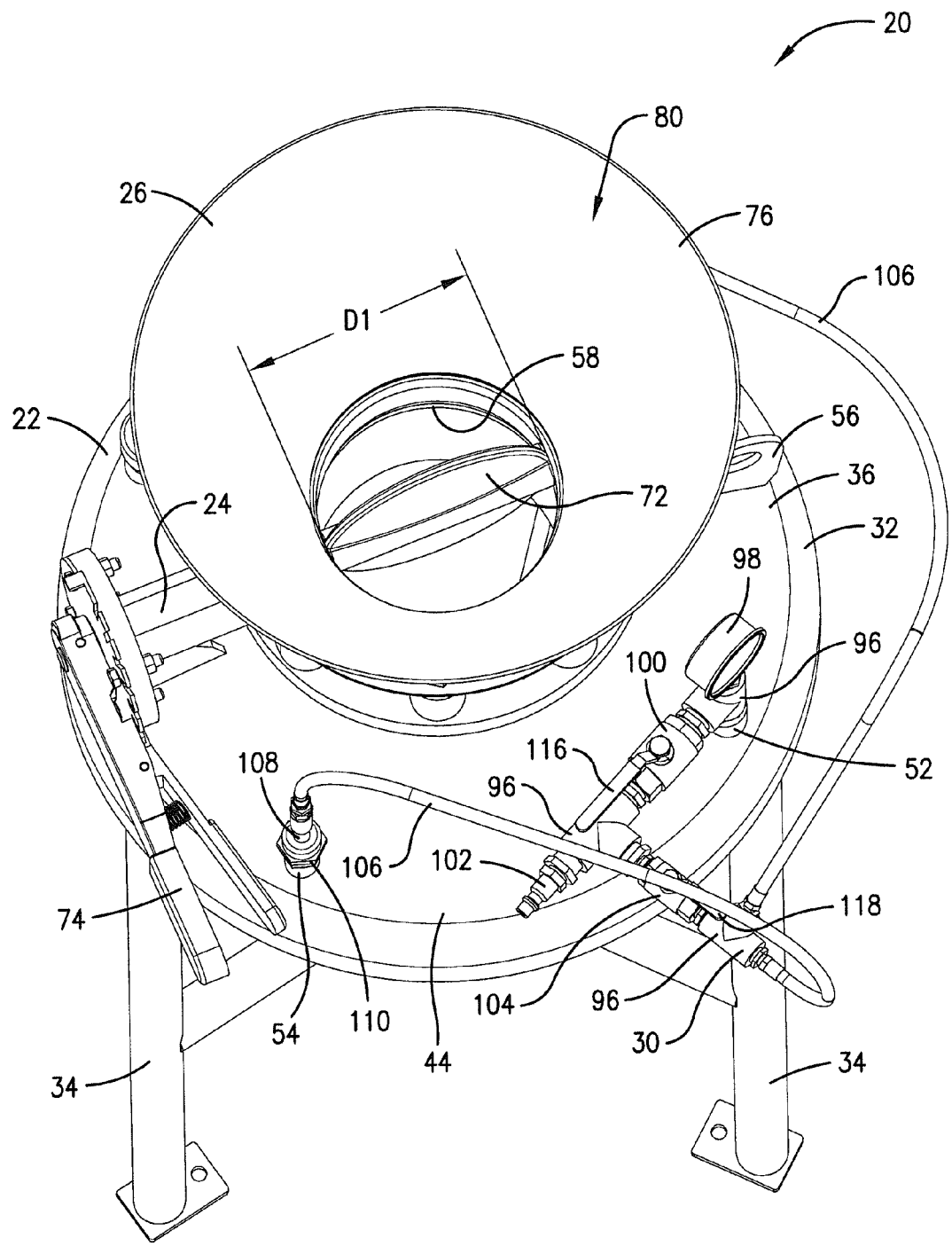
FIG. 3 is a top view of the pneumatic conveyor shown in FIGS. 1 and 2, showing the fill valve opened to permit an operator to load the pressure vessel with fine material to be conveyed.

The tube 48 of the inlet section 36 preferably presents an uppermost inlet opening 58 to provide access to the chamber 42 (see FIG. 3). As will be discussed, the inlet opening 58 permits the operator to manually load the chamber 42 with material P. The inlet diameter dimension D1 (see FIG. 3) preferably ranges from about two inches (2") to about twelve inches (12") and, more preferably, is about eight inches (8").

The pressure relief fitting 50 preferably comprises a one inch (1") coupling. The fitting 50 preferably receives a pressure relief valve (not shown). The main air fitting 52 preferably comprises a three-quarter inch (0.75") coupling. Each injection fitting 54 preferably comprises a one half inch (0.5") coupling. However, it is within the ambit of the present invention where the fittings 50,52,54 are alternatively configured. For example, one or more of the fittings 50,52,54 could be alternatively sized. One or more of the fittings 50,52,54 could also be alternatively positioned on the tank 32. For instance, as will be discussed, the injection fittings 54 could be alternatively constructed and/or positioned on the tank 32.

The tubular section 38 is preferably unitary and includes a wall 59 that extends endlessly about a longitudinal axis A of the tank 32 to form a tube with upper and lower tube ends 60,62 (see FIG. 6). The shape of the tubular section 38 tapers generally from the upper tube end 60 to the lower tube end 62 so that the wall 58 is inclined. Thus, the tubular section 38 preferably has a frustoconical shape.

The wall 58 of the illustrated tubular section 38 is preferably inclined to define an angle α relative to a horizontal plane H, where the axis A is perpendicular to the horizontal plane H (see FIG. 6). The angle α preferably ranges from about sixty degrees (60°) to about ninety degrees (90°) and, more preferably, ranges from about sixty degrees (60°) to about eighty degrees (80°). Most preferably, the angle α is about seventy degrees (70°). However, for some aspects of the present invention, the angle α could be less than about sixty degrees (60°).

The principles of the present invention are applicable where the tubular section 38 has an alternative inclined wall construction. While the illustrated angle α is preferably constant about the longitudinal axis A and along the length of the tubular section 38, the angle α could vary about the axis A and/or along the length of the tubular section 38.

Also, while the tubular section 38 preferably has a generally frustoconical shape, the tubular section 38 could have an alternative tapered shape. For instance, although less preferred for various reasons, the tubular section 38 could have a pyramidal frustum shape with three or more sides.

The wall 59 preferably has a wall thickness dimension of about one quarter inch (0.25"). The wall 59 and other components of the pressure vessel 22 preferably include an alloyed carbon steel, although the pressure vessel could include other metals, such as stainless steel.

The lower fitting 40 preferably includes a concentric reducer 64 with a one inch (1") coupling end 66 (see FIG. 4). The coupling end 66 defines a tank outlet opening 68 with an outlet diameter dimension D2 (see FIG. 4). The outlet diameter dimension D2 preferably ranges from about one half inch (0.5") to about two inches (2") and, more preferably, ranges from about three-quarters inch (0.75") to about one and one half inches (1.5"). Most preferably, the outlet diameter dimension D2 is about one inch (1"). However, the principles of the present invention are applicable where the lower fitting 40 has an alternative configuration.

The tank 32 preferably presents an outermost diameter dimension Td (see FIG. 6) that ranges from about one foot (1') to about five feet (5') and, more preferably, is about two feet (2'). The tank 32 also preferably presents a length dimension L (see FIG. 6) that ranges from about two feet (2') to about ten feet (10') and, more preferably, is about three and a half feet (3.5'). However, the tank 32 could be alternatively dimensioned without departing from the scope of the present invention.

The fill valve 24 is operable to be opened and closed by a user to selectively load the pressure vessel 22 with material P. The fill valve 24 includes a valve body 70, a rotatable valve plate 72, and a handle 74 (see FIG. 3). In the usual manner, the valve plate 72 is rotatably supported by a shaft (not shown). The handle 74 is attached to the shaft so that rotation of the handle 74 by the operator causes the valve plate 72 to rotate. Thus, the operator can shift the handle 74 to rotate the valve plate 72 between an open valve position (see FIGS. 3 and 4) and a closed valve position (see FIGS. 5 and 6). The fill valve 24 preferably comprises an 8 Inch Series 31 Resilient Seated Butterfly Valve, manufactured by Bray International, Inc. of Houston, Tex. However, it is within the ambit of the present invention where the fill valve 24 is alternatively configured.

The funnel 26 is preferably unitary and includes a conical tube portion 76 and a flange 78 welded to one another. The tube portion 76 presents a passage 80 that tapers to a diameter dimension of about eight inches (8") adjacent the flange 78 (see FIG. 3).

The fill valve 24 and the funnel 26 are removably attached to the flange 26 of the tank 32 with threaded fasteners 82. The fill valve 24 is positioned adjacent the inlet opening 58 and is operable to be opened and closed to selectively open and close the inlet opening 58.

However, it will be appreciated that the conveyor 20 could be alternatively configured to provide access to the chamber 42 for loading the chamber 42 with material P. Furthermore, while the illustrated conveyor 20 is preferably manually loaded with material P, the conveyor 20 could be configured to be machine-loaded with material P.

To load the pressure vessel 22, the operator can open the fill valve 24 by rotating the handle 74 so that the inlet opening 58 is opened. The operator can then manually load the material P by pouring the material P into the funnel 26, with the funnel 26 directing the material P downwardly through the valve 24 and the inlet opening 58 and into the chamber 42. Once the operator has loaded the desired amount of material P into the chamber 42, the operator can then close the fill valve 24 by rotating the handle 74 so that the chamber 42 is sealed closed.

Turning to FIGS. 2 and 4-6, the discharge tube assembly 28 is configured to direct the flow of pressurized material P from a downward flow direction to a lateral flow direction. The discharge tube assembly 28 preferably includes 45-degree elbows 84, brass hex nipples 86, a ball valve 88, and a hose fitting 90. The discharge tube assembly 28 also preferably includes a flexible hose 92 attached to the hose fitting 90. The flexible hose 92 preferably presents a length that ranges up to one hundred ten feet (110'). The hose 92 preferably comprises a clear hose that includes a synthetic resin material. Furthermore, the hose 92 is preferably pressure rated for service up to one hundred fifty pounds per square inch (150 psi).

The illustrated elbows 84, nipples 86, ball valve 88, hose fitting 90, and hose 92 all preferably define passages (not shown) having a nominal diameter dimension of about one inch (1"). However, the nominal passage diameter dimension of the elbows 84, nipples 86, ball valve 88, hose fitting 90, and hose 92 could range from about one half inch (0.5") to about two inches (2") without departing from the scope of the present invention.

The illustrated arrangement of elbows 84 and nipples 86 is preferred to turn the flow of material P from the downward flow direction to the lateral flow direction. It has been found that this configuration enables the outlet opening 68, elbows 84, and nipples 86 to convey Type 3 materials while having a nominal passage diameter dimension of about one inch (1").

The ball valve 88 preferably comprises a manually-operated quarter-turn ball valve that includes a handle 94 that can be turned by the operator to selectively open and close the valve 88. However, the valve 88 could be alternatively configured. For instance, the valve 88 could include an electronically controlled valve.

To load the chamber 42 with material, the ball valve 88 of the discharge tube assembly is preferably closed by the operator to prevent material P from flowing out of the chamber 42. The ball valve 88 of the discharge tube assembly 28 can be selectively opened by the operator to discharge material P from the chamber 42. As will be discussed, the chamber 42 is preferably pressurized with compressed air prior to opening the ball valve 88. When the desired amount of material P has been conveyed from the chamber 42, the operator can close the ball valve 88 to prevent the flow of any material P out of the chamber 42.

The pressure vessel 22 is preferably configured to receive a batch of material P having a weight that ranges up to about one hundred (100) pounds.

Turning to FIGS. 1-6, the pneumatic supply assembly 30 is operable to selectively provide compressed air to the chamber 42. The pneumatic supply assembly 30 preferably includes a tee fittings 96, pressure gauge 98, main inlet valve 100, air supply coupler 102, and injection inlet valve 104 (see FIG. 3). The pneumatic supply assembly 30 also includes pneumatic tubing lines 106, pneumatic injection lines 108, and compression fittings 110.

In the usual manner, the coupler 102 is preferably configured to be removably fluidly connected to a source of compressed air (not shown). The assembly 20 preferably uses compressed air to charge the vessel 22 and convey material P, partly because compressed air is readily available and relatively inexpensive. However, it will be appreciated that another compressed gas could be used in the disclosed conveyor 20 to convey material P.

The injection lines 108 each include a continuous, unitary tube that presents an injection port 112 at a lower end and an upper end 114 fluidly connected to a corresponding line 106. Each injection line 108 is preferably positioned to extend into and out of the chamber 42 by extending through the corresponding injection fitting 54. The injection line 108 is sealingly mounted on the fitting 54 with one of the compression fittings 110 to prevent air from leaking between the fitting 54 and the line 108.

The injection line 108 preferably extends into the chamber 42 so that the injection port 112 is positioned adjacent the outlet opening 68. Specifically, the injection port 112 is preferably spaced above the outlet opening 68 to define a vertical port spacing dimension D3 (FIG. 4). The port spacing dimension D3 preferably ranges from about six inches (6") to about ten inches (10") and, more preferably, is about eight inches (8"). However, the injection ports 112 could be alternatively vertically spaced from the outlet opening 68.

The injection ports 112 are preferably located adjacent the wall 59 and face in a generally downward direction toward the outlet opening 68. In the illustrated embodiment, the injection ports are located on diametrically opposite sides of the axis A, which is coaxial to the axis of outlet opening 68. It has been found that this positioning causes each of the injection ports 112 to inject compressed air so that the injected air flow sparges (i.e., agitates) the material P adjacent the outlet opening 68. It has been determined that this sparging of the material P helps the material P to be discharged through the outlet opening 68 and flow smoothly in a dense-phase flow through the discharge tube assembly 28 without becoming partly or entirely clogged. Specifically, sparging of the material P restricts the material P from "bridging" (i.e., where material collects at a location) adjacent the outlet opening 68 or within elbows 84. Consequently, positioning and operation of the illustrated injection ports 112 restricts material P from clogging the conveyor 20 and thereby overcomes the bridging and clogging problems associated with conventional conveying equipment.

The inlet valves 100,104 preferably comprise manually-operated quarter-turn ball valve that each include a respective handle 116,118. The handles 116,118 can be turned by the operator to selectively open and close the valves 100, 104. However, the valves 100,104 could be alternatively configured. For instance, the valves 100,104 could be electronically controlled. The inlet valves 100,104 are preferably fluidly connected in parallel with one another so that each controls a corresponding flow of compressed air to the chamber 42.

The main inlet valve 100 can be selectively opened to permit fluid communication between the coupler 102 and the main supply port 53. Thus, when the assembly 30 is fluidly coupled to a compressed air source, the main inlet valve 100 can be selectively opened to permit compressed air to flow from the compressed air source to the chamber 42.

The injection inlet valve 104 can be selectively opened to permit fluid communication between the coupler 102, tubing lines 106, the injection lines 108, and the injection ports 112. Thus, when the assembly 30 is fluidly coupled to a compressed air source, the injection inlet valve 104 can be selectively opened to permit compressed air to flow from the compressed air source to the chamber 42. However, the pneumatic supply assembly 30 could be alternatively configured without departing from the scope of the present invention.

To charge the chamber 42 with compressed air, the fill valve 24 and the ball valve 88 are preferably closed. With the assembly 30 fluidly coupled to the compressed air source, the inlet valves 100,104 are then preferably opened so that compressed air can flow into the chamber 42. While the main inlet valve 100 is preferably opened before the injection inlet valve 104, the main inlet valve 100 can be opened at the same time or after opening of the inlet valve 104.

As the chamber 42 is being charged with compressed air, one or both of the valves 100,104 can be adjusted by the operator to increase or decrease the flow rate of compressed air through the ports 53,112 into the chamber 42. The operator determines the pressure within the chamber 42 by checking the pressure reading on the pressure gauge 98.

The ball valve 88 of the discharge tube assembly 28 is preferably kept in a closed position as the pressure in the chamber 42 reaches a predetermined pressure for conveying material P. When the pressure within the chamber 42 has reached the desired pressure, the main inlet valve 100 is preferably closed so that compressed air stops flowing through the port 53. At the same time, the injection inlet valve 104 is preferably kept open so that compressed air is only supplied to the chamber 42 by injection ports 112.

For conveying Type C materials, it has been found that the chamber 42 should be charged to a gauge pressure (i.e., the pressure above ambient pressure) that ranges from about forty pounds per square inch (40 psi) to about one hundred pounds per square inch (100 psi) and, more preferably, ranges from about forty pounds per square inch (40 psi) to about eighty pounds per square inch (80 psi).

Once the predetermined pressure is reached within the chamber, the ball valve 88 is preferably opened to begin discharging material P out of the chamber 42. The ball valve 88 is preferably opened after closing the main inlet valve 100, although the ball valve 88 could be opened prior to or at the same time as the main inlet valve 100 is closed.

The injection inlet valve 104 preferably is kept open after the ball valve 88 is opened. The injection air flow provided by the injection ports 112 sparges (i.e., agitates) the material P as material P passes out of the chamber 42. The injection inlet valve 104 is preferably closed once substantially all of the material has been transported out of the chamber 42. However, the injection inlet valve 104 could be closed while the material P is evacuated from the chamber 42. The ball valve 88 is also closed so that the pressure vessel 22 can be loaded with another batch of material.

In operation, the pressure vessel 22 is manually loaded with material P by the operator. Prior to loading, the operator preferably closes the ball valve 88 and opens the fill valve 24. The operator can then load the material P by pouring the material P into the funnel 26, with the funnel 26 directing the material P downwardly through the valve 24 and the inlet opening 58 and into the chamber 42. Once the operator has loaded the desired amount of material P into the chamber 42, the operator can then close the fill valve 24 by rotating the handle 74 so that the chamber 42 is sealed closed.

Before conveying the material P, the operator charges the chamber 42 with compressed air by opening the inlet valves 100,104. The operator closes the main inlet valve 100 once the pressure in the chamber 42 reaches the predetermined pressure for conveying material P. The operator also keeps the injection inlet valve 104 open so that compressed air continues to be supplied by injection ports 112. Furthermore, the operator opens the ball valve 88 to begin discharging material P out of the chamber 42. The injection air flow provided by the injection ports 112 sparges the material P as material P passes out of the chamber 42. Once substantially all of the material P has been discharged, the operator closes the injection inlet valve 104 and the ball valve 88.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:
1. A pneumatic conveyor operable to convey fine powder material, said conveyor comprising:
   a pressure vessel presenting a continuous elongated chamber with opposite upper and lower chamber ends and being operable to receive fine powder material and to be selectively pressurized with compressed air to pressurize and convey the fine powder material in a dense-phase flow,
   said pressure vessel including uppermost and lowermost vessel ends associated with the upper and lower chamber ends, respectively,
   said lowermost vessel end presenting an outlet to discharge the dense-phase flow of pressurized fine powder material from the lower chamber end,
   said pressure vessel further including a unitary tubular section and an endmost inlet section that forms the uppermost vessel end,
   said unitary tubular section extending continuously between the upper vessel end and the lower vessel end to define the chamber,
   said unitary tubular section having a frustoconical shape and including an inclined wall that extends upwardly relative to the outlet, said inclined wall being inclined at an angle relative to the horizontal, with the angle ranging from about sixty degrees to about eighty degrees so that fine powder material in the chamber is collected by the inclined wall and urged toward the outlet to restrict the fine powder material from bridging within the chamber; and a pneumatic supply assembly that provides compressed air to the chamber when pressurizing the vessel, said pneumatic supply assembly including at least one pneumatic supply line that extends through the inlet section so that the pneumatic supply assembly fluidly communicates with the chamber entirely through the inlet section, with all of the compressed air being supplied to the chamber by passing through the inlet section, said at least one pneumatic supply line presenting a pneumatic injection port located within the chamber, with the injection port located adjacent the outlet to inject compressed air into the flow of pressurized fine powder material.

2. The pneumatic conveyor as claimed in claim 1, said injection port located adjacent the inclined wall and facing downwardly toward the outlet.

3. The pneumatic conveyor as claimed in claim 2; and a second pneumatic injection port fluidly communicating with the chamber, both of said injection ports being located adjacent the outlet to inject compressed air, with the injection ports being on diametrically opposite sides of an axis of the outlet.

4. The pneumatic conveyor as claimed in claim 1, said injection port being spaced a distance above the outlet, with the distance ranging from about six inches to about ten inches.

5. The pneumatic conveyor as claimed in claim 4, said outlet presenting an outlet diameter, with the outlet diameter ranging from about one half of an inch to about two inches.

6. The pneumatic conveyor as claimed in claim 5; and a discharge tube attached to the outlet of the pressure vessel to turn the flow of pressurized fine material through a turn angle of at least about 90 degrees.

7. The pneumatic conveyor as claimed in claim 6, said discharge tube including two 45 degree elbows attached relative to one another, with the elbows cooperatively providing the turn angle.

8. The pneumatic conveyor as claimed in claim 1, said pressure vessel presenting a material inlet spaced above the outlet to permit the addition of fine material to the chamber; and a fill valve shiftably mounted in the inlet to selectively open and close the inlet.

9. The pneumatic conveyor as claimed in claim 1, said pneumatic injection line being spaced from the tubular section.

* * * * *